United States Patent [19]

Uhlmann

[11] Patent Number: 5,355,325
[45] Date of Patent: Oct. 11, 1994

[54] METHOD AND APPARATUS FOR CORRELATING OBJECT MEASUREMENTS WITH OBJECT MEASUREMENT ESTIMATES

[75] Inventor: Jeffrey K. Uhlmann, Alexandria, Va.

[73] Assignee: The United States of America as represented by the Secretary of the Navy, Washington, D.C.

[21] Appl. No.: 903,390

[22] Filed: Jun. 24, 1992

[51] Int. Cl.⁵ .............................................. G01S 17/42
[52] U.S. Cl. .................................................. 364/516
[58] Field of Search .................. 364/516; 434/44; 395/21, 50, 62; 342/189

[56] References Cited

U.S. PATENT DOCUMENTS

| | | | |
|---|---|---|---|
| 4,348,186 | 9/1982 | Harvey et al. | 434/44 |
| 4,825,055 | 4/1989 | Pollock | 364/516 |
| 4,849,906 | 7/1989 | Chodos et al. | 364/516 |
| 4,855,932 | 8/1989 | Cangiani et al. | 364/516 |
| 4,958,224 | 9/1990 | Lepore et al. | 364/516 |
| 5,062,056 | 10/1991 | Lo et al. | 364/516 |
| 5,128,684 | 7/1992 | Brown | 364/516 |
| 5,164,910 | 11/1992 | Lawson et al. | 364/516 |

OTHER PUBLICATIONS

J. K. Uhlmann, "Correlating Lines-of-Sight Measurements with Point Estimates," Proceedings of the SDI Tracking Panels (Jul. 1991).

*Primary Examiner*—Jack B. Harvey
*Assistant Examiner*—Thomas Peeso
*Attorney, Agent, or Firm*—Thomas E. McDonnell; Edward F. Miles

[57] ABSTRACT

A method for efficiently determining correlations between tracks and objects in a multi-target tracking system comprises defining a current track measurement estimate for each track, and building a measurement tree from the track measurement estimates. The estimates may be either point or volume measurement estimates. After defining the measurement tree, a measurement defining a volume measurement is taken of one of the objects. The measurement is correlated to one or more tracks by searching the measurement tree. The tree is searched by determining, at each node of the tree, if the volume measurement intersects the particular track point or volume measurement estimate associated with the particular node. Additionally, a search volume is associated with each node, such that the decision to search further paths emanating from a particular node is made by determining if the volume measurement intersects the associated search volume.

28 Claims, 17 Drawing Sheets

METHOD AND APPARATUS FOR CORRELATING OBJECT MEASUREMENTS WITH OBJECT MEASUREMENT ESTIMATES

BACKGROUND OF THE INVENTION

1. Field of the Invention

The present invention relates to a method and apparatus for correlating volume or line measurements to volume or point estimates of the measurement. One example of such a system is a multi-target tracking system, which correlates volume measurements of an object from a known position, wherein the object and the known position are moving relatively to each other, to a volume measurement estimate of the position or the like of the object made from an extrapolation of a track of the object, wherein the track is generated from previous volume measurements of the object.

2. Description of Related Art

Multiple-target tracking (MTT) systems are necessary whenever a sensor and a plurality of objects or the like are moving relative to each other. Common physical examples of multiple-target tracking include 1) tracking of airborne, space traveling, or water borne objects such as aircraft, satellites and other orbiting objects, or submarine and other naval craft; 2) tracking of objects moving in a fluid or pneumatic line, such as cells or other objects in a vein or soot particles and the like in a smokestack; 3) tracking of objects or particles in a simulation of a physical system; and 4) tracking of virtual objects in a virtual reality.

In any MTT environment, a limiting factor in the accuracy and usefulness of the system is the ability to correlate n sets of present measurements of location data (or the like) of n objects with n tracks generated from previous measurements. A brute force method of comparing every one of n tracks to everyone of n measurements requires $n^2*t_{(n)}$ time, where $t_{(n)}$ is the average time per comparison. Clearly, for all but the most trivial problems, pure brute force comparison to determine which measurement corresponds to which track cannot be done in real time.

Accordingly, it is well known that computational efficiencies can be obtained by first identifying those tracks which are most likely to correlate to a particular measurement, and comparing by brute force only those identified tracks. If sufficient computational efficiencies are obtained, it is possible to correlate n measurements with n tracks in real-time.

MTT is one example of a general system which generates a measurement defining a volume or a line, and an estimate of the measurement which is defined as a volume or a point, wherein a limiting factor of the general system is the ability to correctly and efficiently correlate a plurality of volume or line measurements to a plurality of volume or point measurement estimates.

SUMMARY OF THE INVENTION

It is an object of the present invention to efficiently identify those volume or point measurement estimates which are likely to correlate to a given volume or line measurement.

It is another object of the present invention to more efficiently identify those tracks which are likely to correlate to a given line-of-sight measurement.

It is another object of the present invention to provide a method and apparatus for correlating a plurality of tracks with a plurality of line-of-sight measurements in real time.

To this end, the present invention proposes a method for correlating volume or line measurements to volume or point measurement estimates, wherein a set of n measurement volume or point estimates of current data is decomposed into a tripart tree structure, wherein each node of the tree has exactly one element of the set associated with it, and a unique subset of the elements associated with each of the three branches descending from the node. Accordingly, each element of the set is described by a unique path through the tree.

The tree is constructed by defining, for each node of the tree, a set of n volume or point measurement estimates and a minimal volume enclosing all the elements of the set. An arbitrary element from the set is associated with the node and removed from the set. If any elements remain, a partitioning plane, which partitions the minimal enclosing volume into two sections is selected. Each of the remaining elements of the set associated with the node is placed into one of three unique subsets, depending on whether the element intersects the partitioning plane, is entirely to the left of the partitioning plane, or is entirely to the right of the partitioning plane.

This, and in related matters, are touched on the papers by the inventor, Correlating Lines-of-Sight Measurements with Point Estimates, which appeared in the Proceedings of the SDI Tracking Panels (July, 1991), and Correlating Lines-of-Sight with Points, which is unpublished. A copy of both papers is filed with this Specification, and the disclosure of each paper is incorporated herein by reference.

BRIEF DESCRIPTION OF THE DRAWINGS

The invention will be described in detail with reference to the following drawings, wherein like reference numerals describe like features, and:

FIG. 1A is a block diagram of a tracking system for a missile or the like;

DETAILED DESCRIPTION OF PREFERRED EMBODIMENTS

Multiple Target Tracking (MTT) and its associated problems arise whenever a plurality of objects or "targets" and a sensor are moving relative to each other. An MTT system develops a "track", or data set, for each object, which describes the current position, bearing, range, trajectory or the like of the target with respect to a sensor of the MTT system. The track for each object is determined from previous sensor measurements of that object, and is used to generate an estimate of the next measurement of the position, bearing, range, trajectory or the like of the object with respect to the sensor during the next sighting period. These estimates must then be correlated to the actual measurements of the objects made by the sensor. Once an actual measurement has been correlated to the appropriate object, the track can then be updated and corrected.

MTT systems have traditionally been limited to such physical systems as 1) radar-based aircraft tracking, both for civilian uses like air traffic control and military uses like targeting and fire control; 2) radar- and optical-based missile tracking, especially ballistic missile tracking of multiple independent reentry vehicles, decoys and chaff; 3) radar- and optical-based spacecraft tracking, especially reconnaissance satellites and other maneuverable orbiting craft; and 4) sonar-based submarine tracking.

Figure 2:
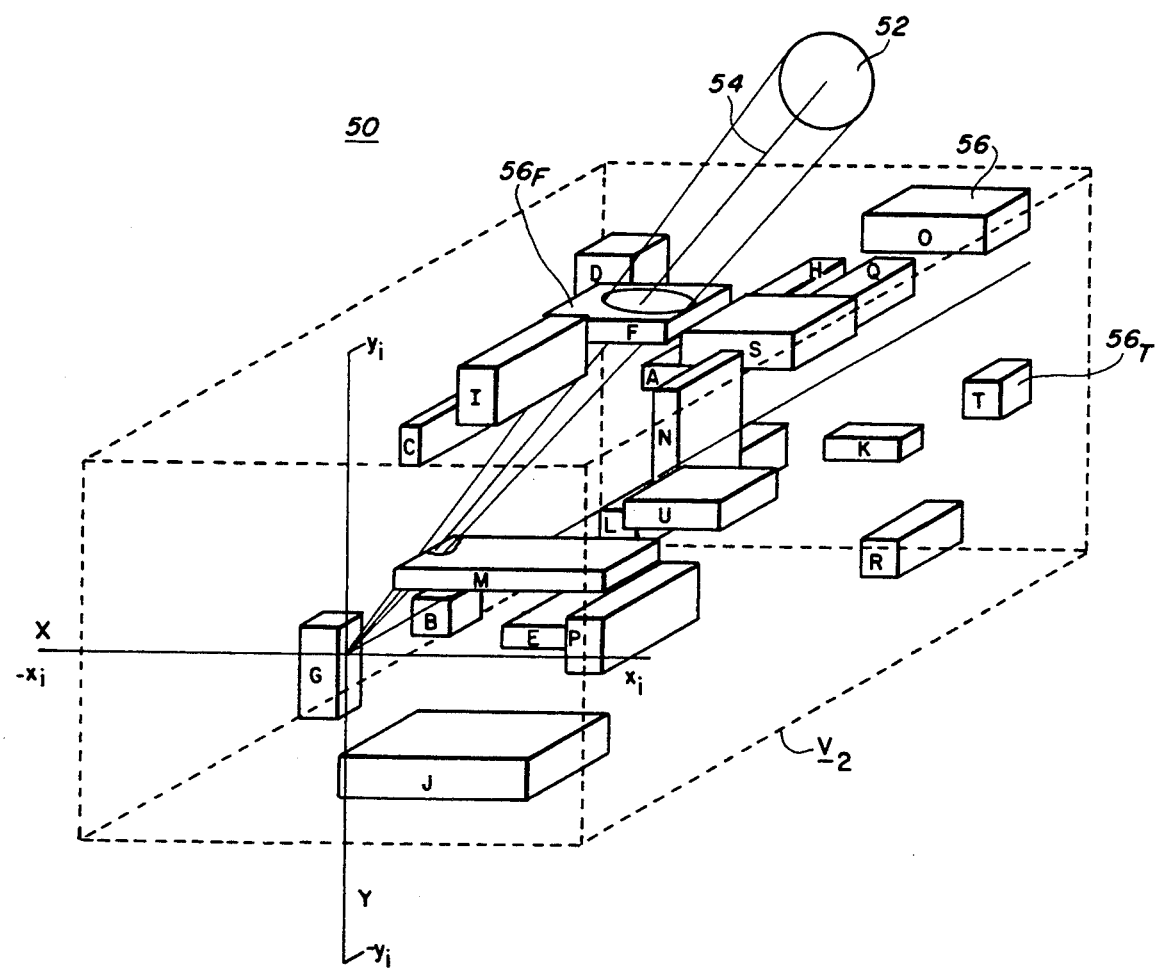
FIG. 2 is a graphical representation of a plurality of volume measurement estimates and a volume measurement.

These uses have generally relied upon sensors which generate data defining a volume measurement. Such sensors include radar and sonar; optical sensors, such as infrared detectors and laser rangefinders; photographic and other visual sensors; and any traditional active or passive sensor. As shown in FIG. 2, such volume measurement sensors have some error associated with their measurements, requiring the actual measurement data to be represented as a cylinder with an axis w defining a line-of-sight of the sensor and a radial error $r_e$, or a cone having a radial error $r_e(l)$, where l is the distance from the sensor. If the sensor provides range data as well as line-of-sight data, the cylinder or cone will have a finite length, based on the range error $r_r$. Otherwise, as shown in FIG. 2, the cylinder or cone will extend infinitely from the sensor. (Of course, it is understood that the volume measurement will degenerate to a line when the error $r_e$ is reduced to zero.) Likewise, each track, which is generated from the sensor measurement, will have an error associated with it. As shown in FIG. 2, the error associated with the instantaneous estimate of position, bearing or the like defines a volume measurement estimate. The volume measurement estimate is generally rectangular, as the error associated with each axis is generally different but constant. The orientation of the track volume measurement estimate for an object will depend on the type of sensor and the relative movement between the object and the sensor.

In addition to its traditional applications, MTT is now being used in scientific, computer simulation, and virtual reality applications. The tracking of individual blood cells in vivo, such as red cells, white cells or platelets using optical sensors or radioisotope sensors, or the tracking of particles generated in a high-energy accelerator, using photographs, electromagnetic sensors and bubble chambers as sensors are two examples of scientific, non-military MTT applications. Likewise, tracking of particles in a computer simulation of a high energy accelerator, or of particle iteration in a variety of situations, such as simulations of molecular dynamics, aerodynamics, fluid dynamics or the like, are some examples of "simulated" non-military MTT applications. Finally ray-tracing and plane-of-view/line-of-sight determinations in computer graphics and virtual reality applications are types of MTT where the sensor, usually a computer display representing a real person's viewpoint into the virtual reality, may move relative to virtual, generally stationary, solid volume objects.

The one common characteristic to all these applications is that the estimate of the next measurement of the object from the "track" or the object itself is defined as a geometric volume. Likewise, the "measurement" is defined as an infinitely extending volume, such as a cylinder or a cone.

Figure 1A:
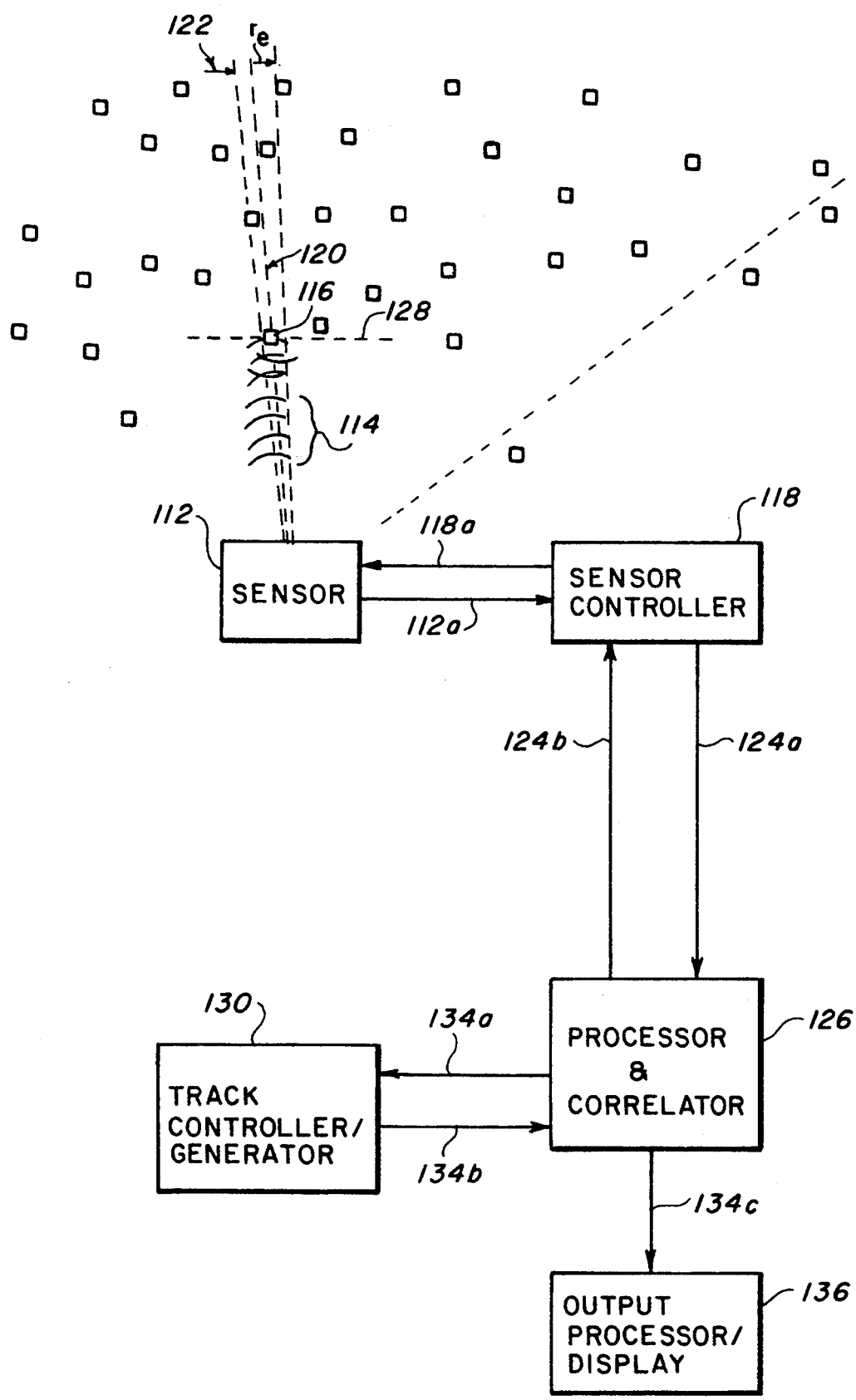

As shown in FIG. 1A, in a purely physical MTT system 110, an active sensor 112, such as radar, sonar, laser range-finding and the like, sends out an active signal 114, which reflects from an object 116 being tracked and is detected by the sensor 112. The sensor 112 generates a signal 112a representative of the measurement 120. From the sensor signal 112a, the sensor controller 118 generates a data signal 124a representative of the measurement 20 and the associated error $r_e$ for the measurement 120, which defines a volume measurement 122. The sensor controller 118 outputs the data signals 124a for each reflection of active signal 114, representing the measurement 120 and the volume measurement 122, to a correlator 126. The correlator 126 identifies which volume measurement 122 corresponds to the one of the tracks 128 representing the object 116 which reflected active signal 114. After determining the volume measurement 122 corresponding to the track 128, the measurement signals 134a, representative of the measurement 120 and the volume measurement 122, are output to the track generator 130. The track generator 130 updates the track data representing the corresponding track 128, based on the corresponding measurement signals 134a. The track generator 130 then generates a new track 128 and a new track volume estimate for each object 116. The track volume estimate represents the range of possible positions for the track 128 during the next sighting period, and includes both the uncertainty associated with the track 128, and the error introduced in extrapolating the track 128. The track generator 130 then outputs signals 134b, representing the new track 128 and track volume estimate, to the correlator 126. The correlator 126 then outputs signals 135c, representing the measurement 120, the volume measurement 122 and the new track 128, to the Output/Display processor. The output/display processor then controls a missile battery, a visual display or the like. The correlator 126 also outputs signals 124b, which also represent the new track 128 and track volume estimate, to the sensor controller 118. The sensor controller can use signals 124b to reorient the sensor 112, so that the sensor 112 is oriented on the expected position of the object 16 at the next measurement period. Alternative, the sensor 112 can be a passive sensor, such as an optical scanner, video camera, or CCD array, which senses energy emitted by the target or emitted from a separate source reflected from the target.

In a purely simulated system, the state of each of a plurality of simulated objects or particles is represented as a geometric volume of a state-space. The volume represents both the physical extent of a real particle, and the uncertainty associated with the state of the simulated particle. The physical system is modeled by the simulation by defining the physical characteristics of the objects, their volumes, and the forces acting on the objects. Rather than modeling the objects using purely linear, deterministic equations, the simulations use non-linear and/or probabalistic equations such that the actual state of the simulated objects has some inherent uncertainty, which is modeled as a geometric volume in the defined state-space.

For each period of the simulation, an estimated current "location" of the object in the state-space is modeled as a geometric volume, representing an estimate of the actual "location". The volume estimate is generated as an extrapolation of the "track" of each object, i.e, from its previous values. The state of the entire system for each period is also generated, with the "actual" location of each object in the simulation defined as a geometric volume in the statespace. In this way, the "actual" location volume is analogous to the volume measurement 122, while the volume estimate is analogous to the volume estimate generated by the track generator 130.

Figure 1B:
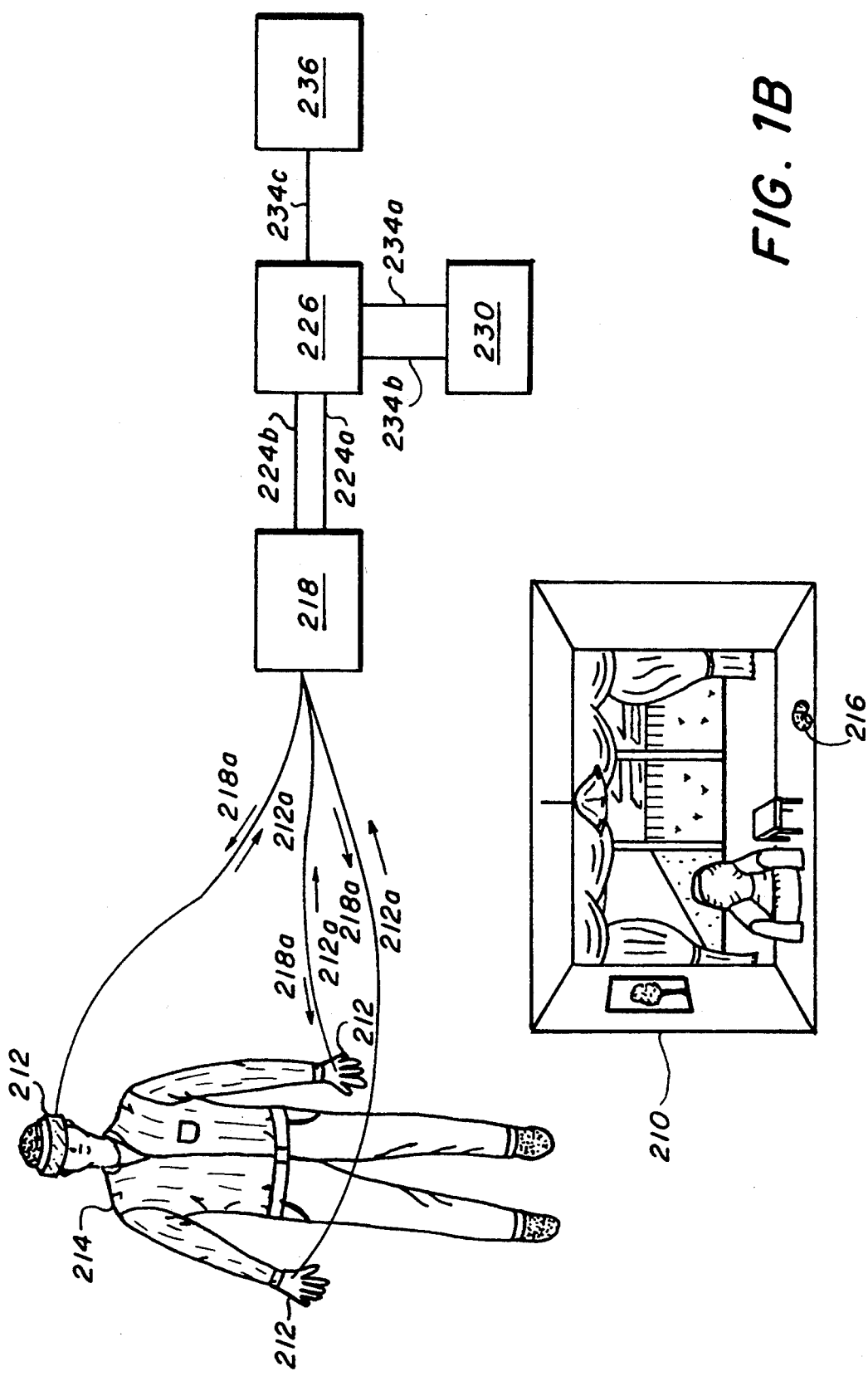
FIG. 1B is a block diagram of a virtual reality system.

As shown in FIG. 1B, in a combined physical/simulated system 210 such as a virtual reality (or a computer graphics display), which interact with the eyes of a person, the sensors 212, worn by a person 214 interacting with the virtual reality 210, detect movement of the person 214. The sensors 212 output signals 212a which are representative of the actions and movements of the person 214. The lines-of-sight 220 and the line-of-sight volumes 222 are defined by the person's eyes viewing objects 216, which inhabit the virtual reality 210, and are determined by sensor controller 218. The sensor controller 218 outputs a data signal 224 for each object 216, which represents the instantaneous line-of-sight volume 222 necessary to view that object. A correlator 226 determines which line-of-sight 220 corresponds to which object 216. An object processor 230 inputs the signals 234a from the correlator 226, determines how the objects are oriented in the virtual reality 210, and outputs signals 234b to the correlator 226. The correlator 226 then generates output signals 234c, which drive visual display 236. The visual display 236 is fitted into a helmet or the like and covers the eyes of person 214. At the same time correlator 226 outputs signals 224b to sensor controller 218. Sensor controller 218 signals 224b represent the persons "physical" interaction with the virtual reality 210, and are used by sensor controller 218 to generate sensor command signals 212a, which cause sensors 212 to provide active feedback from the virtual reality 210 to the person 214. For example, if an object 216 such as a ball, were "picked up" by the person 214, the sensor controller 218 would cause the sensors 212, on the hand "holding" the ball, to stiffen, to represent the "rigidity" of the ball.

FIG. 2 shows a graphical representation of a preferred embodiment of the method of the present invention for a 21 object MTT situation. As shown in FIG. 2, it is possible to define an arbitrary 3 dimensional coordinate system with the sensor 12 at the origin. Accordingly, for an arbitrary field of view 50, the X axis extends horizontally across the field of view, the Y axis extends vertically, across the field of view, and the positive Z axis extends into the field of view. A measurement volume 52 surrounding the measurement 54 represents the actual measurement data for an object 16. Track volume measurement estimates 56 represent extrapolations from current tracks 28 for objects A–U. As shown in FIG. 2, the measurement volume 52 intersects track volume measurement estimate $56_F$, but does not intersect track volume measurement estimate $56_T$. Accordingly, the measurement data represented by measurement 52 correlates to at least object F, represented by track volume measurement estimate $56_F$ but does not correlate to object T.

Figure 3:
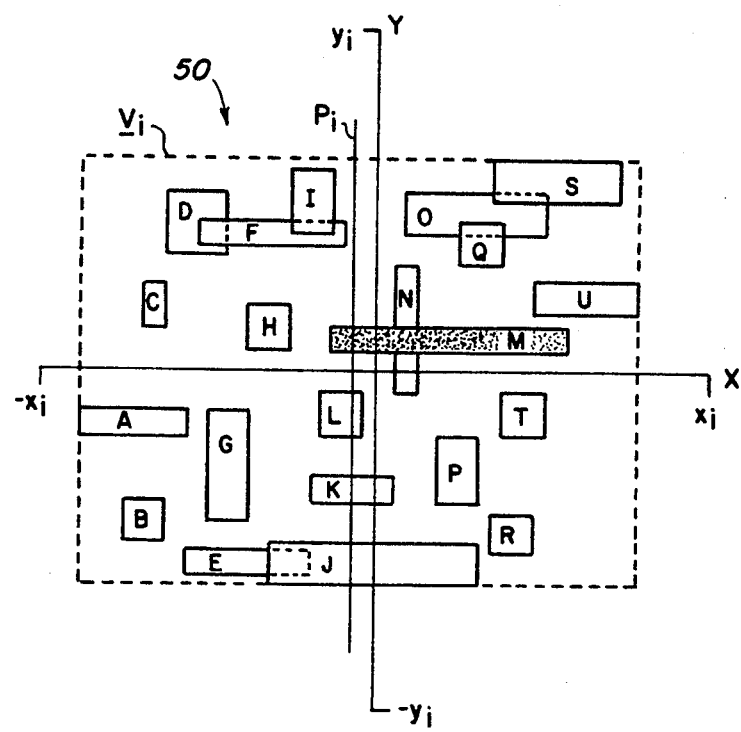
FIG. 3 is a two-dimensional projection of the plurality of three-dimensional volume measurement estimates.

As shown in FIG. 3, the plurality of track volume measurement estimates 56 of a plurality of objects $S_i$ occupy the field of view 50. The field of view 50 is shown in FIG. 3 as a 2 dimensional projection on the X-Y plane, extending from $-x_i$ to $x_i$, along the X-axis, and from $-y_i$ to $y_i$, along the y-axis. Likewise, the track volume measurement estimates 56 are also shown as 2 dimensional projections on the X-Y plane.

To correlate the objects to the appropriate measurement data, according to a preferred embodiment of the present invention, a set S, comprising all of the objects $S_i$ and their associated track volume measurement estimates 56, is determined, then decomposed into a tree structure. Associated to each node of the tree is one element $S_i$ and its associated track volume measurement estimate 56. To identify those objects which are most likely to correlate to a particular measurement 54, and are therefore worth the cost of a brute force computation, each node of the tree is searched.

Figure 8A:
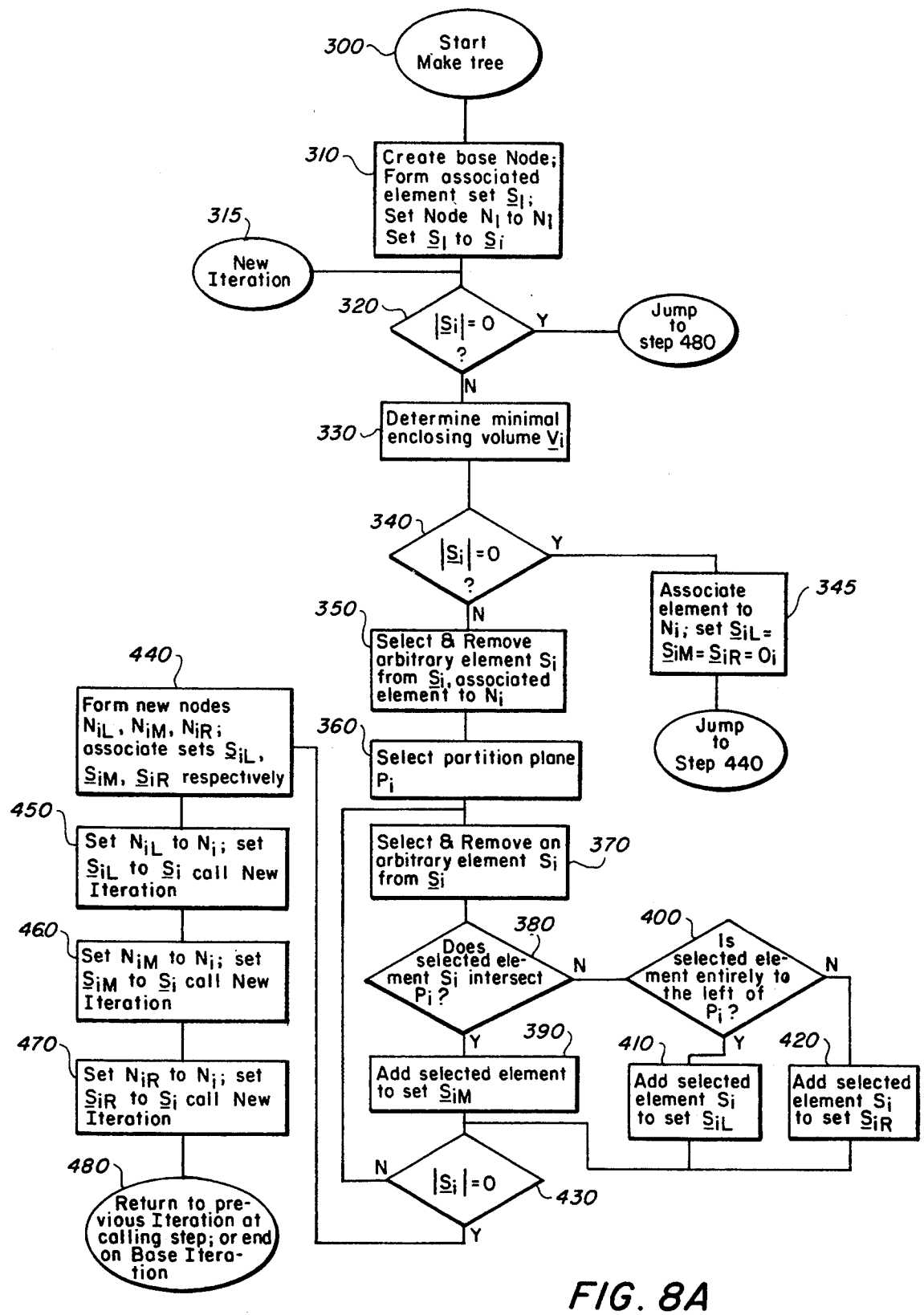
FIG. 8 is a flow chart of a preferred embodiment of the tree forming part of the method of the present invention.
FIG. 8B is a flow chart of a preferred embodiment of the tree searching part of the method of the present invention.

As shown in FIG. 8a, in step 310, the set $S_1$ and the base node $N_1$ are determined and associated together. For the base node $N_1$, $S_1$ is the set of all objects A–U in the field of view 50. In step 320, the current iteration begins by determining the number of elements $S_i$ in set $S_i$. If $|S_i|=0$ (i.e., the set is empty), the volume $v_i$ associated with the node $N_i$ in set to zero, and control jumps to step 450, ending this iteration.

In step 330, a minimal enclosing volume $V_i$, which minimally encloses the track volume measurement estimates 56 of set $S_i$, is determined. For the base node set $S_1$, $V_1$ minimally encloses all of the track volume measurement estimates 56 for objects A–U. In general, the minimal enclosing volume and the track volume measurement estimates to be associated with the current node $N_i$ should be chosen according to the following criteria:

1) the degree to which the selected minimal enclosing volume minimizes the likelihood that the region will intersect a measurement or measurement volume having little proximity to the objects in the current set;
2) the computational cost incurred on determining whether the measurement or measurement volume intersects the track volume measurement estimate or minimal enclosing volume; and
3) the computational cost incurred in determining the track volume measurement estimate or minimal enclosing volume.

For example, computing the convex hull of the current set optimally satisfies the first criterion, but poorly satisfies the second and third criteria. Alternatively, the second and third criteria are well satisfied, at the expense of the first, by defining the volumes as isothetic box having rectangular dimensions of $x_{min}$, $x_{max}$, $y_{min}$, $y_{max}$, $z_{min}$, and $z_{max}$. While the most efficient solution is a polyhedron somewhere between a box and a convex hull, the second solution has the added advantage of being trivial to implement.

In step 340, the number of elements, $|S_i|$, in set $S_i$ is again determined. If $|S_i|=1$, the track volume measurement estimate $v_i$ associated with node $N_i$ is set to equal the track volume measurement estimate $v_i$ of the single element $S_i$ of set $S_i$. Sets $S_{iL}$, $S_{iM}$ and $S_{iR}$ are set to zero. Control then jumps to step 450, ending this iteration.

If $|S_i|>1$, then in step 350 an arbitrary element $S_i$ of set $S_i$ is selected. In a preferred embodiment, element $S_i$ is selected so that the subsequent volumes $V_{iL}$, $V_{iM}$ and $V_{iR}$ of sets $S_{iL}$, $S_{iM}$ and $S_{iR}$ minimally overlap each other. As shown in FIG. 3, the volume measurement estimate $56_M$ associated with element M is selected as the track volume measurement estimate $v_1$ associated with node $N_1$, while the volume 58, which minimally encloses the track volume measurement estimates $56_A$–$56_U$ is set $V_1$.

In step 360, a partitioning plane (or, on the 2-dimensional projection, a partitioning line) $P_i$ is selected. In general, the partition plane $P_i$ should be selected to help minimize the minimal enclosing volume. In a preferred embodiment, partition plane $P_i$ is selected to be as close as possible to the center of the volume 62 of the median element of $S_i$. Accordingly, the partitioning plane $P_i$ should usually intersect at least one element, and approximately half the remaining elements should be on each side of $P_i$.

In step 370, an element $S_i$ of set $S_i$ is selected and removed from set $S_i$. In step 380, it is determined if the track volume measurement estimate 56 of element $S_i$ intersects the partitioning plane $P_i$. If $P_i$ and the track volume measurement estimate 56 intersect, control jumps to step 390, where element $S_i$ is placed in set $S_{iM}$, then control jumps to step 430.

If $P_i$ and track volume measurement estimate 56 of element $S_i$ do not intersect, control jumps to step 400, which determines if track volume measurement estimate 56 of element $S_i$ is entirely to the left of plane $P_i$. If so, control continues to step 410, where element $S_i$ is placed into set $S_{iL}$, otherwise control jumps to step 420, where element $S_i$ is placed into set $S_{iR}$. In both cases, control jumps to step 430. In step 430, it is determined if any element $S_i$ remains in set $S_i$. If any elements do remain, control jumps back to step 370, and steps 370–430 are repeated until each element has been placed into one of the daughter sets, $S_{iL}$, $S_{iM}$, $S_{iR}$. If all of the elements $S_i$ of set $S_i$ have been placed into one of the sets, control continues to step 440.

In step 440, three new daughter nodes, $N_{iL}$, $N_{iM}$ and $N_{iR}$ are formed, and the corresponding set $S_{iL}$, $S_{iM}$ or $S_{iR}$ is associated to the respective node. In step 450, the daughter node $N_{iL}$ is set to the current node $N_i$, and a new iteration begins by jumping to step 320. When the new iteration ends, control is returned to step 450 of the present iteration, and then continues to step 460.

Likewise, in steps 460 and 470, respectively, the daughter nodes $N_{iM}$ and $N_{iR}$ are set to the current node $N_i$ and new iterations are begun. When control is returned to step 470 of the present iteration, control continues to step 480, which ends the present iteration and returns control to the previous iteration. If there is no previous iteration, step 480 simply ends the process.

Figure 8B:
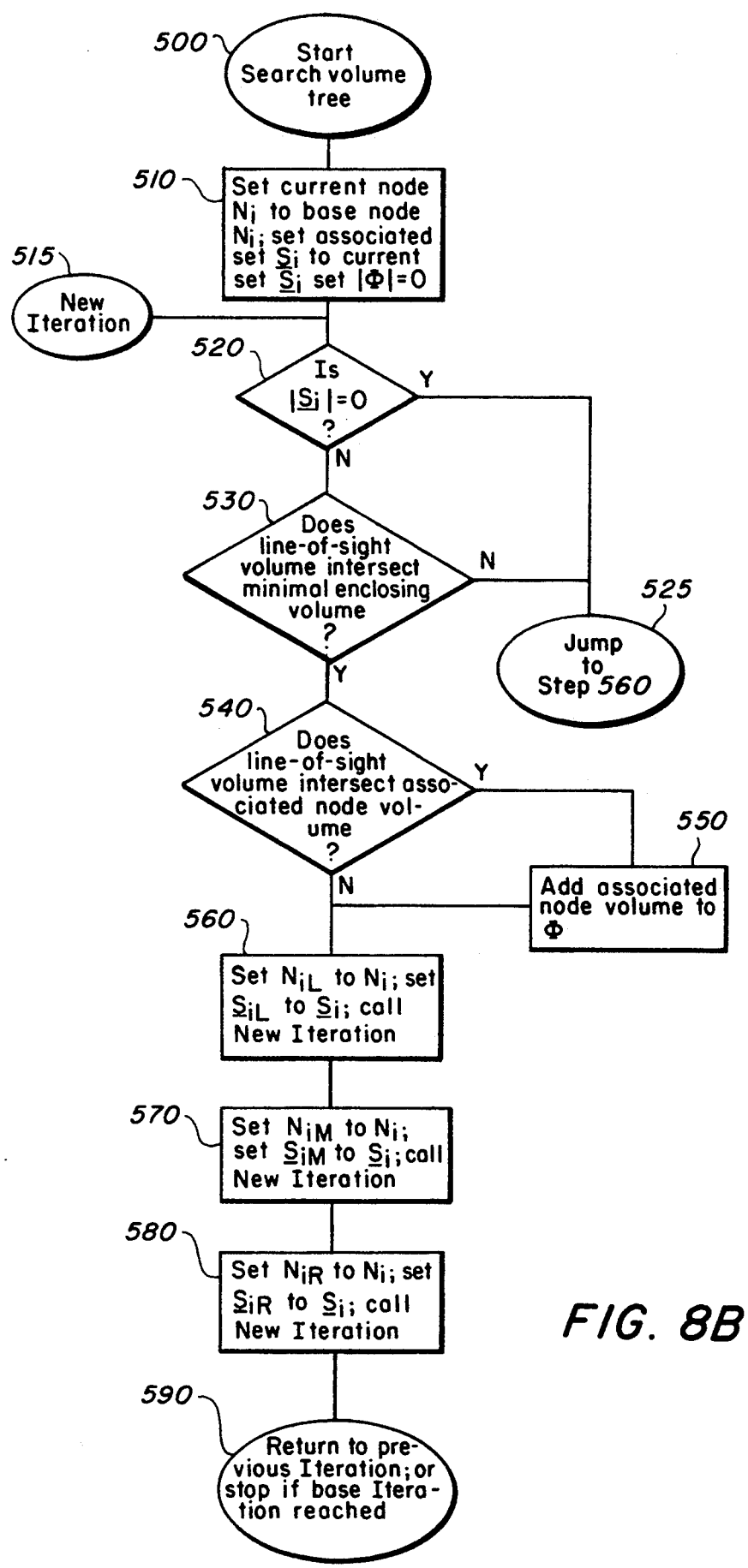

In the preferred embodiment of the method of the present invention, to determine if a measurement correlates sufficiently to a measurement estimate for a brute force comparison to be necessary, the measurement volume 52 is iteratively compared to the volumes $V_i$ and $v_i$ associated with each node of the volume tree, as shown in FIG. 8b.

As shown in FIG. 8b, in step 500, the set $\Phi$, representing the set of elements s whose track volume measurement estimates 56 intersect the measurement volume 52, is set to zero. In step 510, the first iteration is begun by setting the set $S_i$ of the first node to the current set $S_i$. Also, in step 510, the root node $N_1$ is set to the current node $N_i$. In step 520, set $S_i$ of the current node $N_i$, is tested to determine if it is a null set. If so, there are no track volume measurement estimates 56 which intersect the measurement volume 52. Therefore, control jumps to step 590 and returns to the previous iteration.

In step 530, the current set volume $V_i$, which encloses all of the track volume measurement estimate 56 of the current set $S_i$, is tested to determined if it intersects the measurement volume 52. If it does not intersect the set volume $V_i$, then it cannot possibly intersect any of the enclosed track volume measurement estimates 56. If the measurement volume 52 does intersect $v_i$, the flow chart continue to step 540; otherwise control jumps directly to step 560.

In step 540, the track volume measurement estimate $v_i$ associated with present node $N_i$ is tested to determine if it intersects the measurement volume 52. If it does, element $S_i$, corresponding to track volume measurement estimate $v_i$, is added to $\Phi$ in step 550 and then control continues to step 560; otherwise control skips directly to step 560.

In step 560, the daughter node $N_{iL}$ is set to the current node $N_i$, and a new iteration is begun by jumping to step 515. Once daughter node $N_{iL}$, and all its daughter nodes are tested, control continues to step 570, where the daughter node $N_{iM}$, and its daughter nodes are tested. Once all of those nodes are tested, control continues to step 580, where the daughter node $N_{iR}$ and its daughter nodes tested. Once all the daughter nodes of the current node are tested, control continues to step 590, which ends the present iteration and returns control to the previous iteration. If there is not a previous node, step 590 simply ends the tree searching process, and $\Phi$, the set of all intersected track volume measurement estimates 56, is output. Set $\Phi$ can now be used as a limited set of objects for which brute force comparison of their track volume measurement estimates 56 to the measurement 54 and measurement volume 52 is necessary.

Figure 6A:
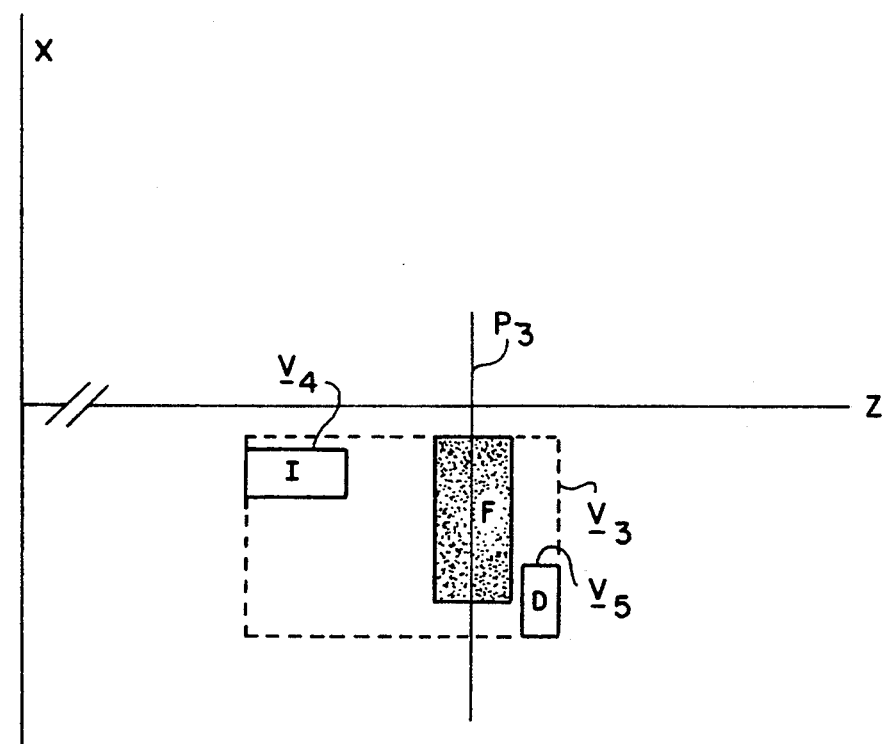
FIGS. 6A–6D are third two-dimensional projections of the volume measurement estimates of FIGS. 5A, 5C, 5D and 5F respectively.
Figure 6B:
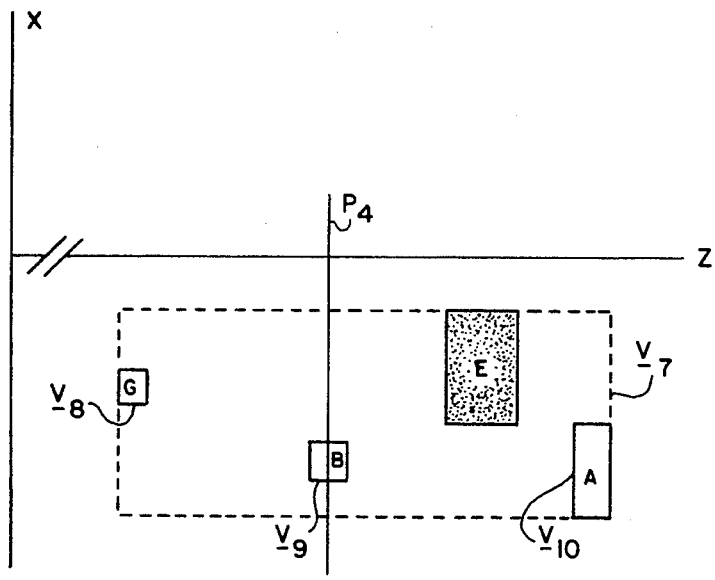
Figure 6C:
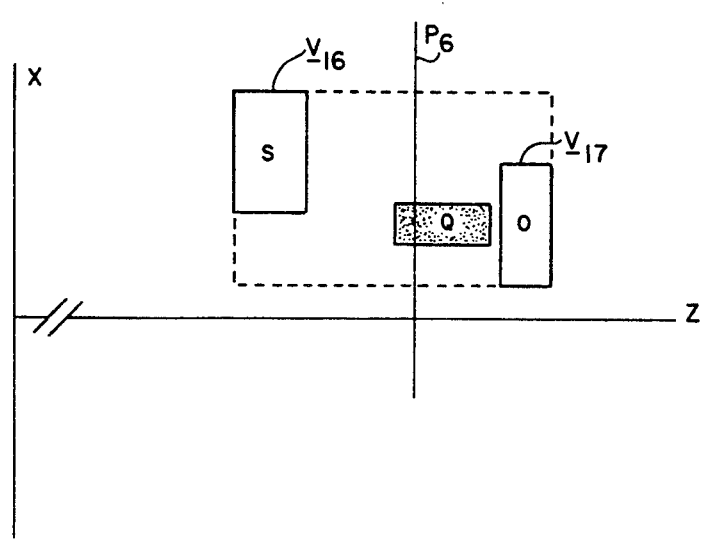
Figure 6D:
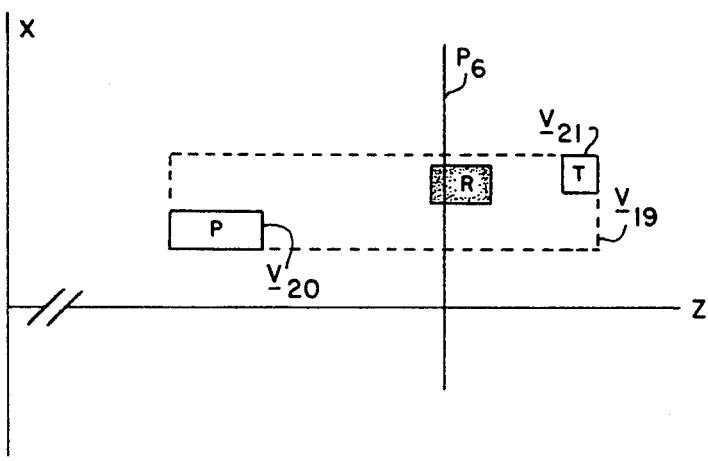
Figure 7:
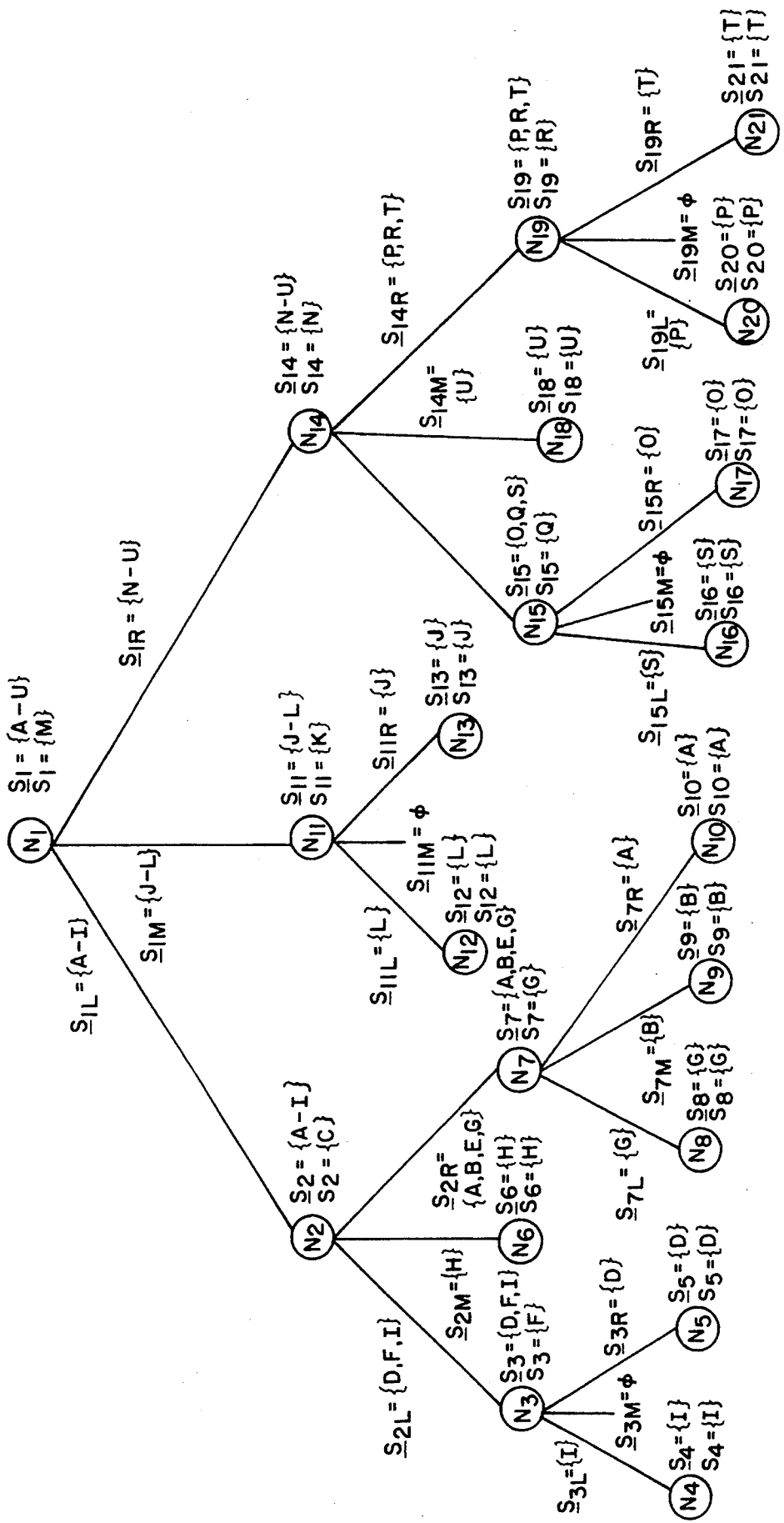
FIG. 7 is a volume tree developed from the plurality of three-dimensional volume measurement estimates.

FIGS. 3–7 illustrate the application of the first preferred embodiment of the present invention. In FIGS. 2 and 3, the track volume measurement estimates $56_A$–$56_N$ for 21 objects A–U are shown respectively in three dimensional perspective and in a 2-dimensional projection on the X-Y plane. The origin represents the location of a sensor 12 or the like, with the Z axis extending positively into the page in FIG. 3. In accordance with step 310, the set $S_1$, containing all the objects A–U, is formed and associated with the base node $N_1$, as shown in FIG. 7. Since $|S_1|>0$ (step 320), a volume $V_1$, which minimally encloses the track volume measurement estimates 56 of objects A–U, is determined (step 330). Since $|S_1|>1$ (step 340), an arbitrary object of set $S_1$ is selected and removed from $S_1$, based on minimizing the overlap between subsequent sets $S_{1L}$, $S_{1M}$ and $S_{1R}$ (step 350). As shown in FIG. 3, the shaded track volume measurement estimate $56_M$ corresponding to object M is selected, and equated to $v_1$, the track estimate volume of node $N_1$ (step 350).

Next, a partitioning plane $P_1$ is selected to intersect the median volume measurement element 56 (step 360).

As shown in FIG. 3, the median volume measurement element 56 is either the one corresponding to object J (56$_J$) or object K (56$_K$), as there are an even number of objects (and volume measurement elements) remaining. In this example, the volume measurement element 56$_K$, corresponding to object K, is chosen.

Next, an arbitrary object of set S$_1$ is selected and removed from set S$_1$ (step 370) and a determination is made whether the track volume measurement estimate 56 corresponding to the object selected intersects the partition plane P$_1$ (step 380) or lies to the left or right of the partition plane P$_1$ (step 400). If the volume measurement element of the arbitrary object intersects the partition plane P$_1$, the object is added to set S$_{1M}$ (step 390), while if it lies entirely to the left side of the partition plane, the object is added to the set S$_{1L}$ (step 410). Otherwise, it must lie entirely to the right of the partition plane and is therefore added to set S$_{1R}$ (step 420). If any objects remain on set S$_1$ (step 430), the process of steps 370-430 is repeated.

Once all the objects have been sorted into sets S$_{1L}$ (FIG. 3A), S$_{1M}$ (FIG. 3B) and S$_{1R}$ (FIG. 3C), the daughter nodes N$_{iL}$, N$_{iM}$ and N$_{iR}$ are formed, and N$_{iL}$ is set to N$_2$ (step 440) and the process of steps 320-430 is repeated (FIGS. 3A, 4A, 5A-C).

Figure 3A:
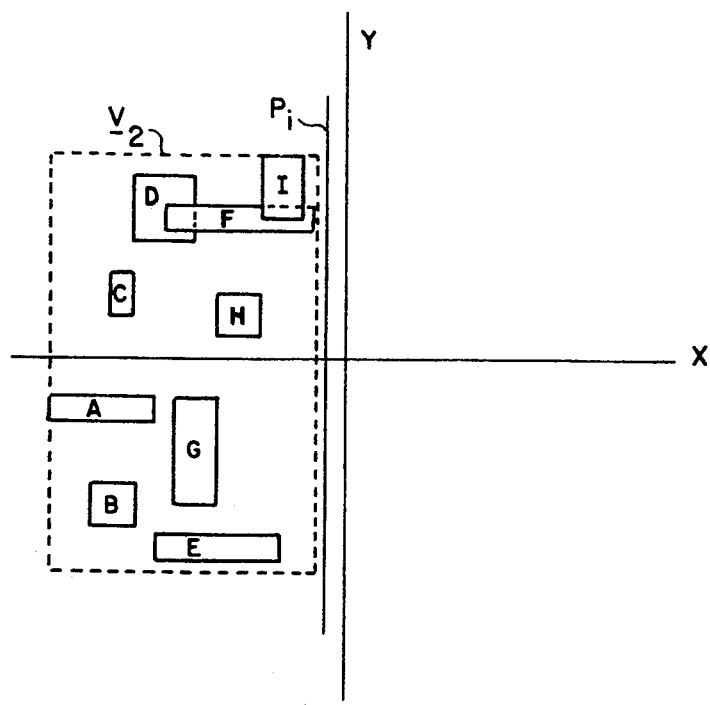
FIGS. 3A–3C are the left, middle and right subsets of FIG. 3.
Figure 3B:
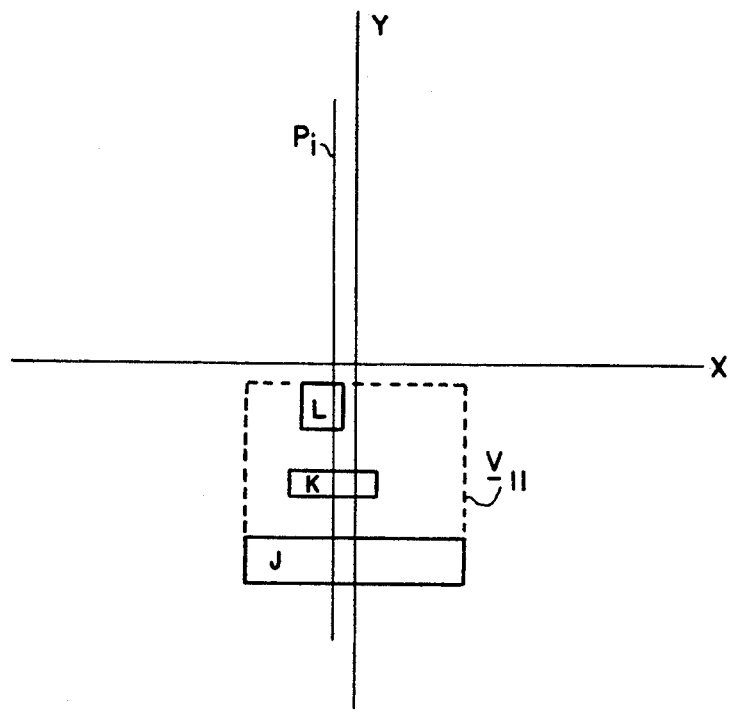
Figure 3C:
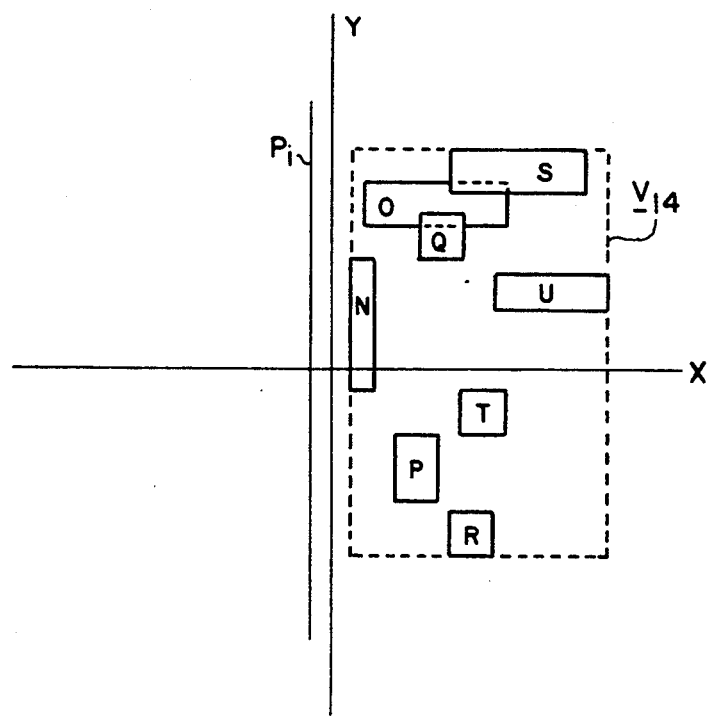
Figure 4A:
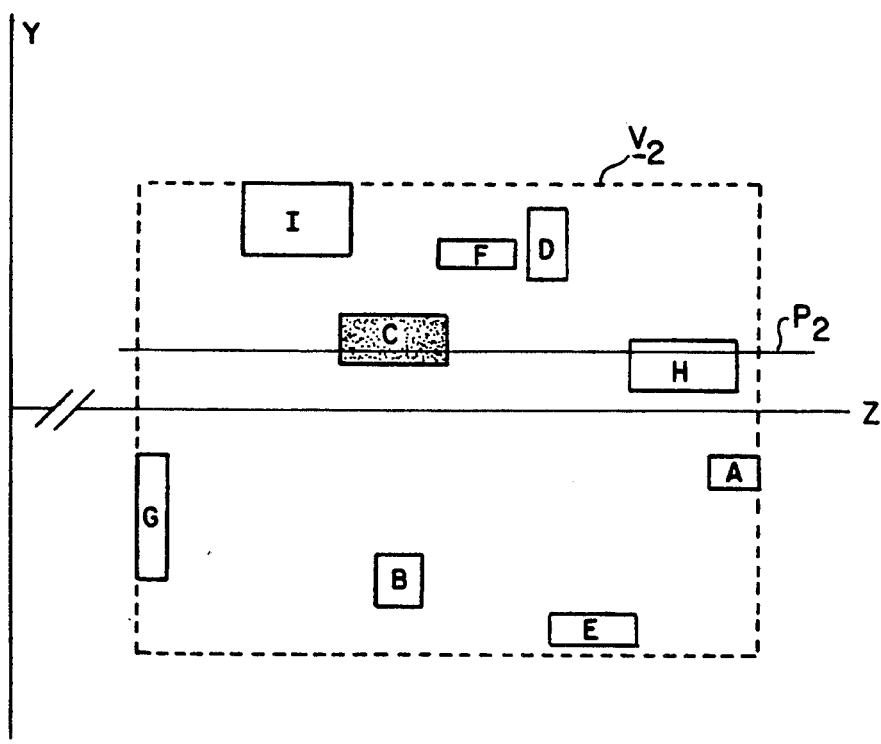
FIGS. 4A–4C are second two-dimensional projections of the volume measurement estimates of FIGS. 3A–3C respectively.
Figure 4B:
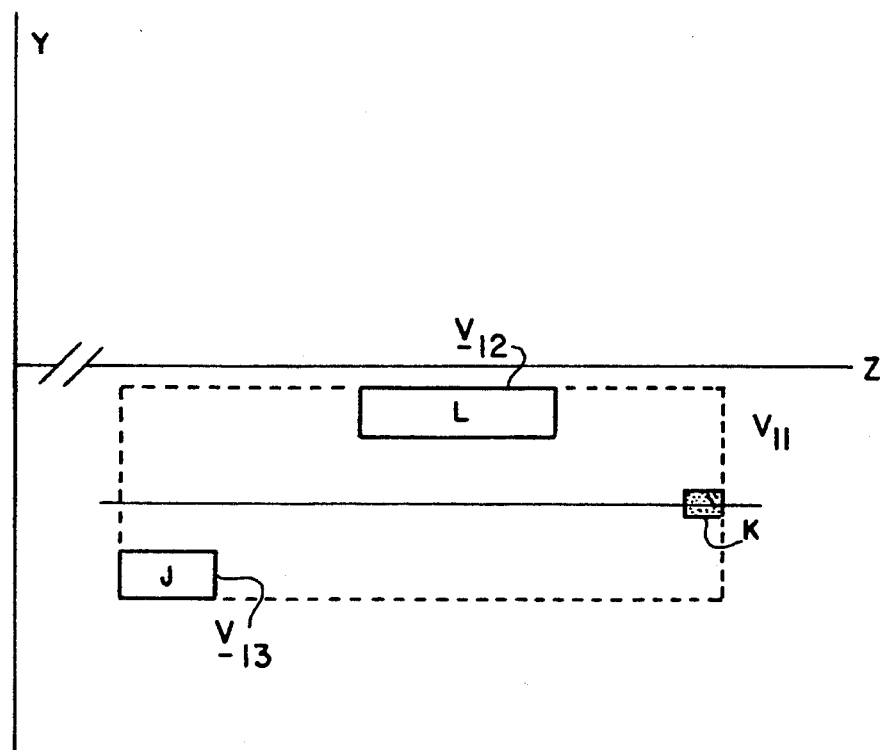
Figure 4C:
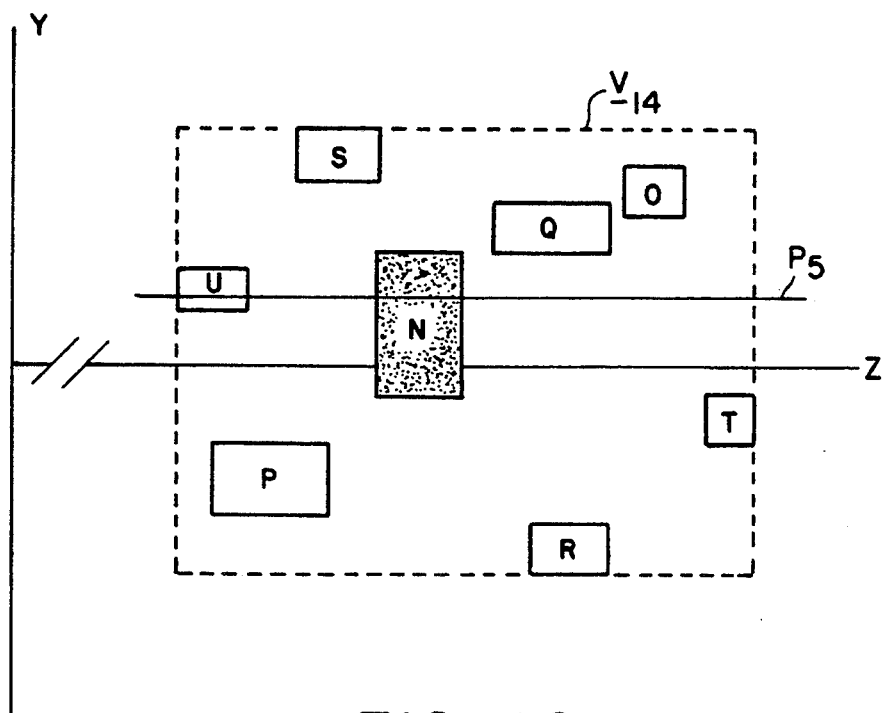
Figure 5A:
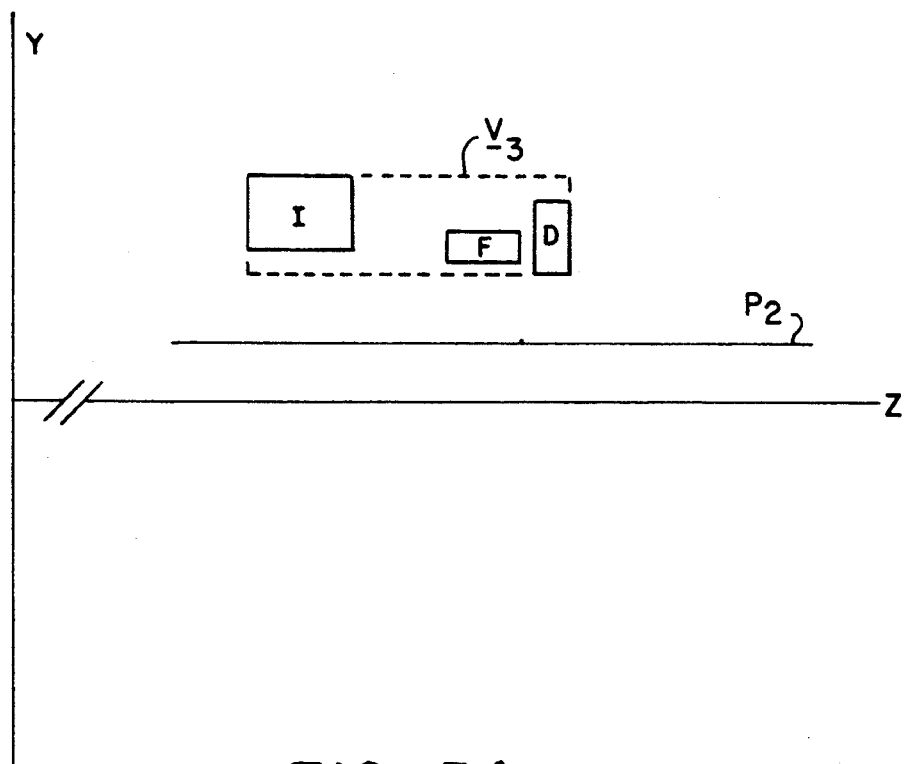
FIGS. 5A–5C are the left, middle and right subsets of FIG. 4A.
Figure 5B:
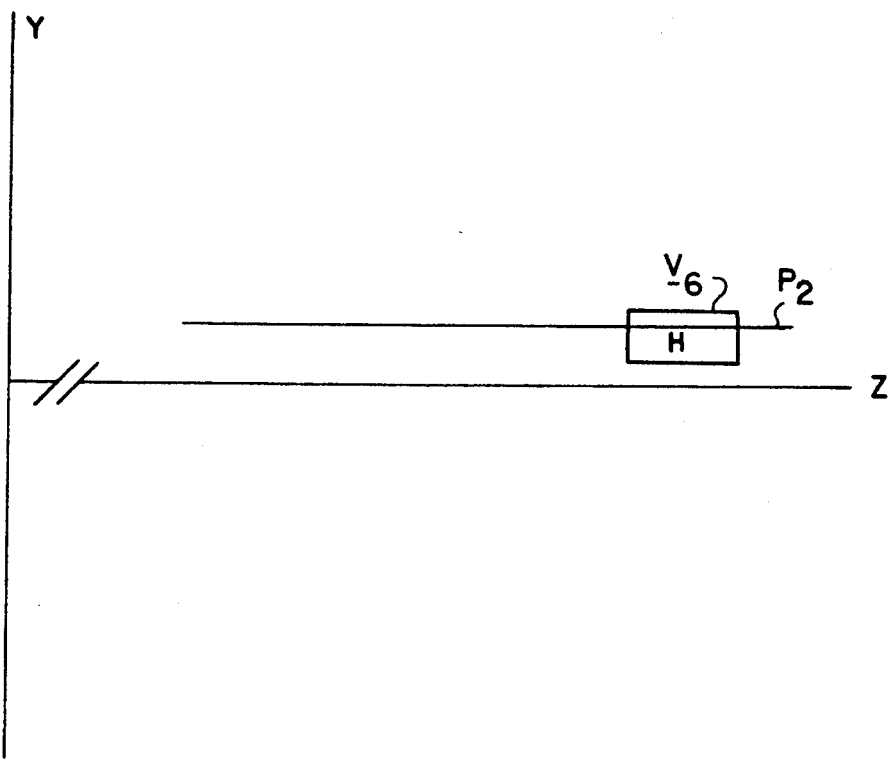
Figure 5C:
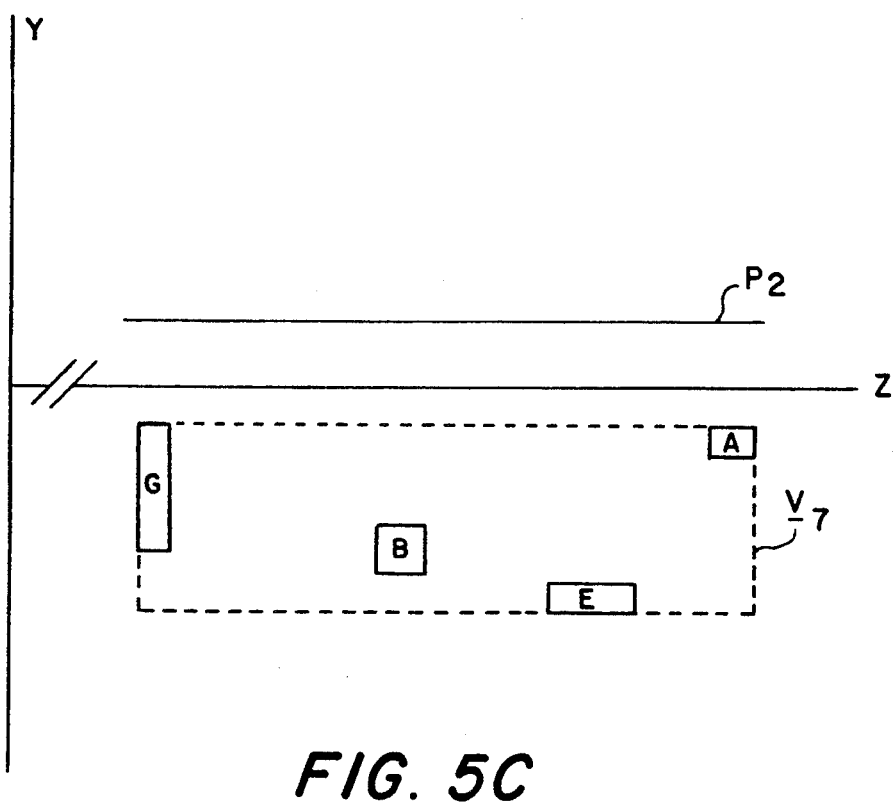
Figure 5D:
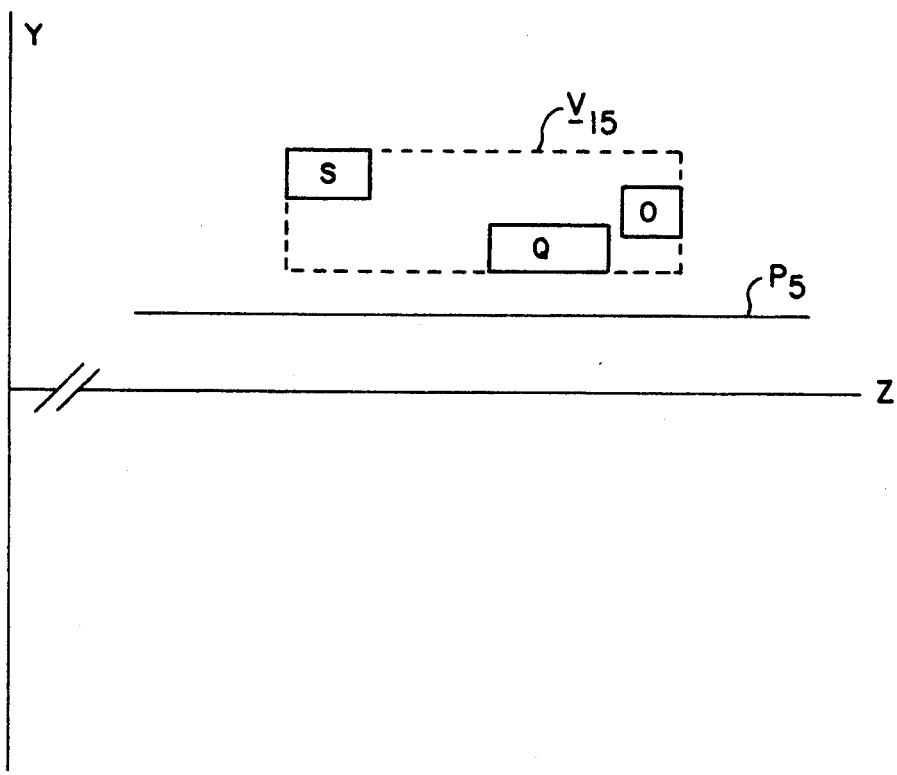
FIGS. 5D–5F are the left, middle and right subsets of FIG. 4C.
Figure 5E:
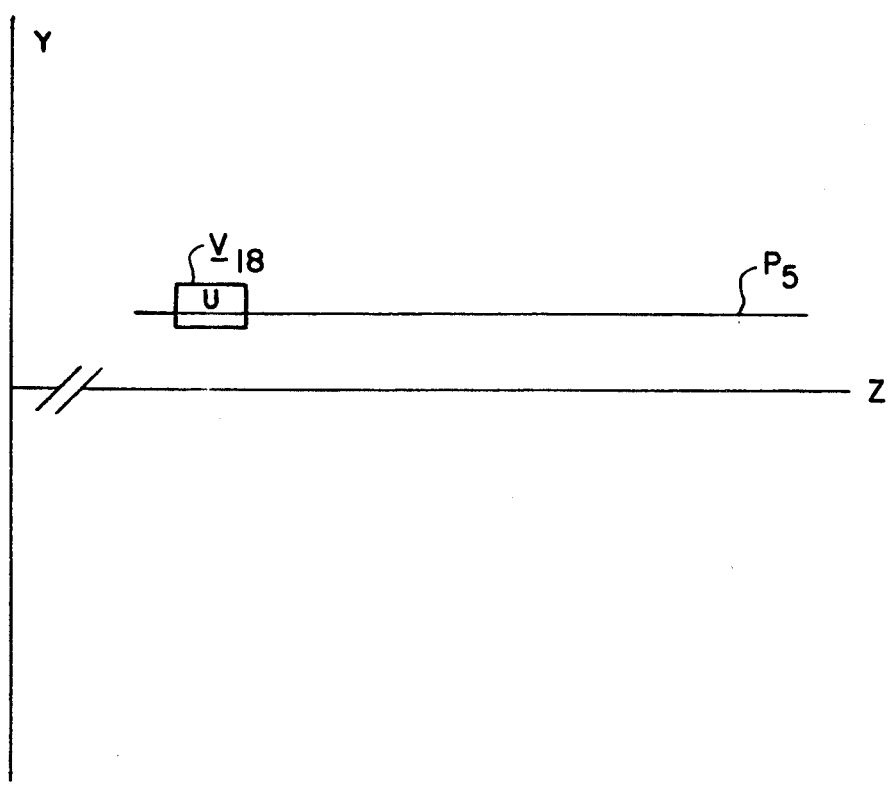
Figure 5F:
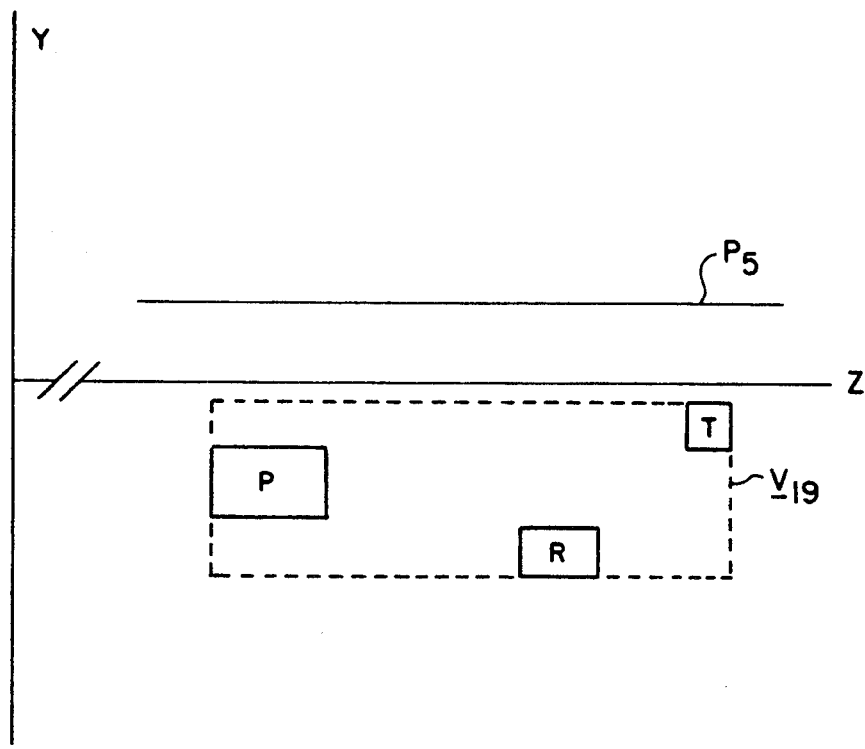

As shown in FIGS. 3A and 7, set S$_2$, corresponding to node N$_2$, consists of objects A-I. A new minimum volume V$_2$ is determined, as is a new track volume measurement estimate 56$_C$ to be associated with node as N$_2$ as v$_2$. A new partition plane P$_2$, this time parallel to the X-Z plane, is selected, and the remaining objects A, B and D-I of set S$_2$ are sorted into new sets S$_{2L}$, S$_{2M}$ and S$_{2R}$, as shown in FIGS. 5A-5C. Step 440 once again repeats steps 320-430 for node N$_{2L}$. As shown in FIG. 5A, set S$_3$, corresponding to node N$_3$, consists of objects D, F and I. A new minimum volume V$_3$ is determined. As shown in FIG. 6A, a new arbitrary element, corresponding here to object F, is selected and its associated track volume measurement estimate 56$_F$ is set to v$_3$, and a new partition plane P$_3$, this time parallel to the X-Y plane, is selected, and the remaining objects, D and I are sorted into new sets S$_{3L}$, S$_{3M}$ and S$_{3R}$. In this case, set S$_{3M}$ is empty.

Step 440 again repeats steps 320-430 for node N$_{3L}$. In this iteration, since S$_4$=S$_{3L}$ has only one object, at step 345, the minimal volume V$_4$ is set equal to the volume of the volume element 56 corresponding to object I, as that must be the minimum value. Likewise, the sets S$_{4L}$, S$_{4M}$ and S$_{4R}$ must be empty.

At this point, since there are no remaining objects, the process returns to step 440 of the N$_3$ iteration. Node N$_{3M}$ is set to node N$_5$ and the process of steps 320-440 is repeated (step 450). However, since S$_{3M}$ is empty (step 320), nothing occurs during this iteration, and the process returns to step 450 (step 430). Since nothing happened in the previous iteration, node N$_{3R}$ is now set to node N$_5$ and the process of steps 320-440 repeated (step 460). Upon return from this iteration, the process is returned to step 440 of the N$_2$ iteration. In this manner, nodes 6 (FIG. 5B), 7 (FIG. 5C), 8-10 (FIG. 6B), 11-13, 19 (FIG. 5F) and 20-21 (FIG. 6D) are formed. The full volume measurement tree is shown in FIG. 7.

The complete volume measurement tree shown in FIG. 7, for the measurement volume 52 shown in FIG. 2, is searched beginning at node N$_1$ (step 500). If set S$_i$, the objects remaining at node N$_i$, is empty, the process ends, or returns to the previous iteration (step 510). Otherwise, if the measurement volume 52 does not intersect the minimum enclosing volume V$_i$, (step 520) then the measurement volume 52 cannot intercept any of the track volume measurement estimates 56 of set S$_i$, and the process ends or returns to the previous iteration. Since, as shown in FIG. 2, the measurement volume 52 intersects the minimum enclosing volume V$_1$, the volume measurement estimate 56$_M$ of the selected object M of node N$_1$ is checked to see if it intersects the measurement volume 52 (step 530). Since it does, object M is added to the intersection set Φ (step 540).

In either case, the sets S$_{1L}$ S$_{1M}$ and S$_{1R}$ of daughter nodes N$_{iL}$, N$_{iM}$ and N$_{iR}$ are checked (steps 550, 560, 570). First node N$_{1L}$ is set to node N$_2$ and is examined by repeating the process of steps 510-550 (step 550). Once node N$_2$ and all its daughter nodes have been examined, node N$_{1M}$, is set to node N$_{11}$, and is examined by repeating the process of steps 510-550 (step 560). Once node N$_{11}$ and all its daughter nodes have been examined, node N$_{1R}$, is set to node N$_{14}$ and it and all its daughter nodes are examined by repeating steps 510-550 (step 570). Once node N$_{14}$ and all its daughter nodes have been examined, the set Φ consisting all objects A through U which have volume measurement estimates 56 intersected by the measurement volume 52 is output as the limited set of objects for which a brute force comparison determination must be made.

Figure 9A:
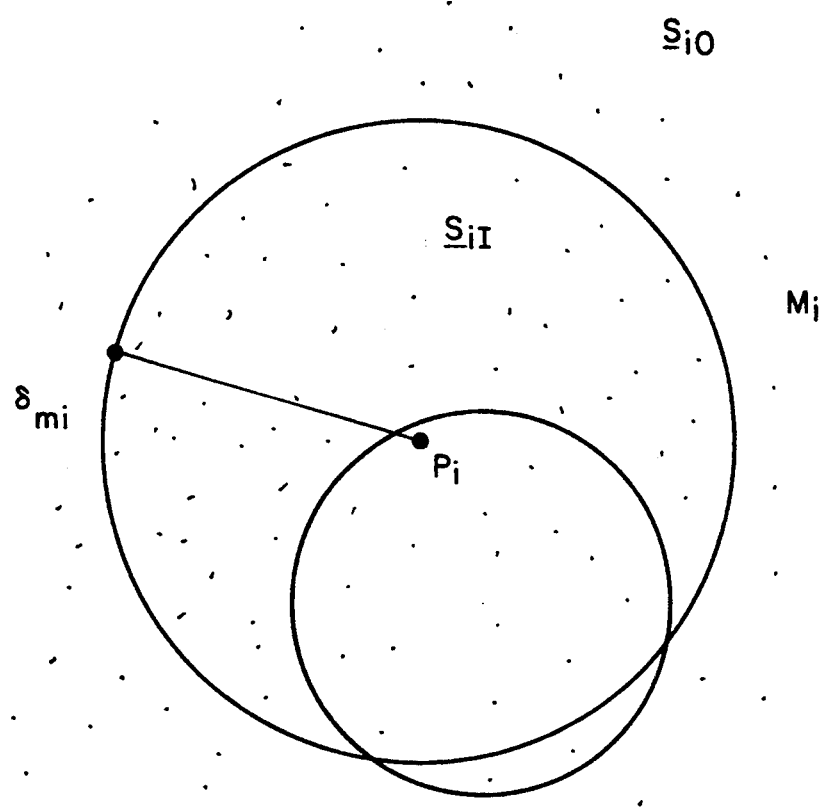
FIG. 9A is a graphical representation of a plurality of point measurement estimates and a volume measurement.
Figure 9B:
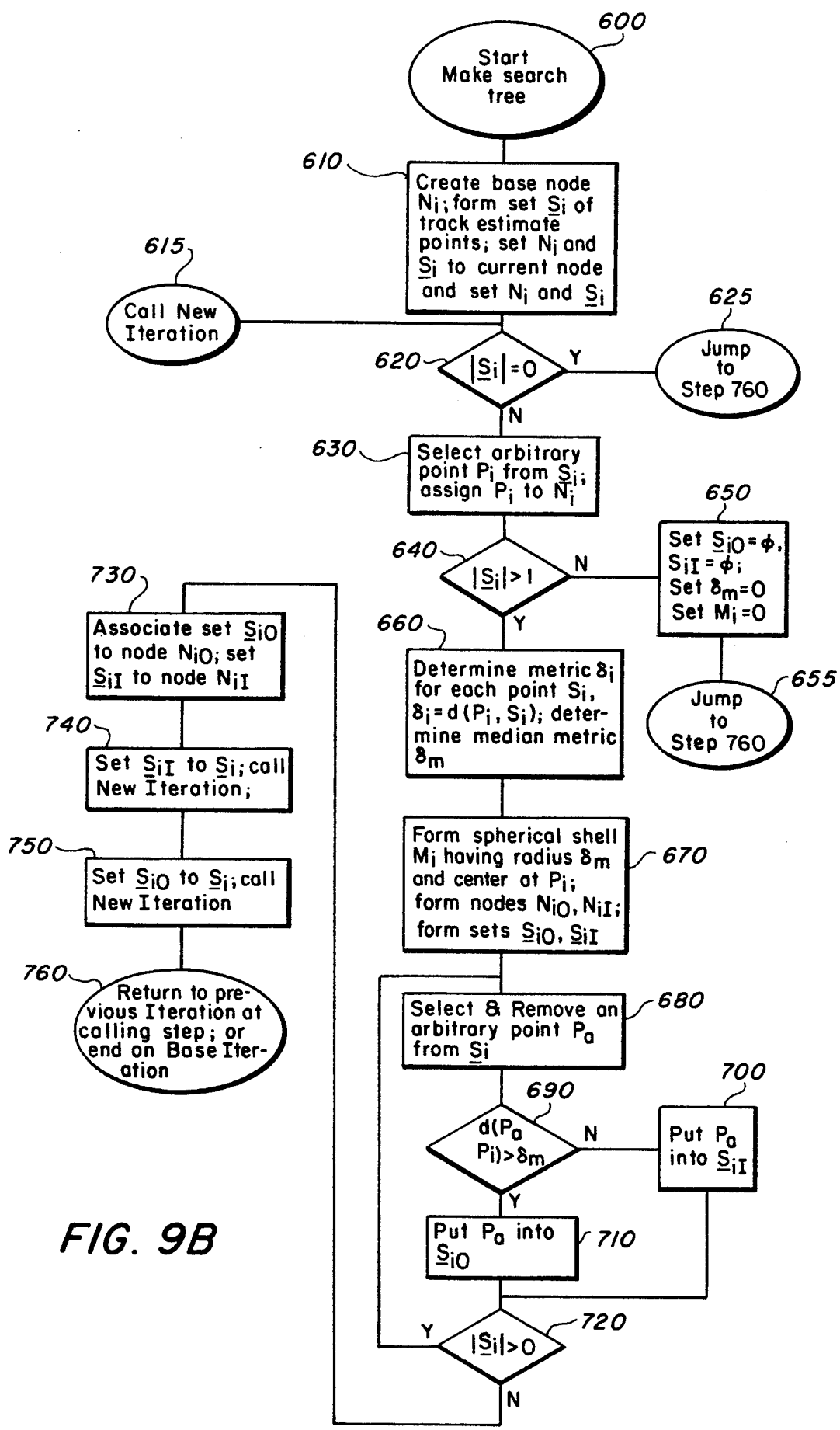
FIGS. 9B and 9C are a flow chart of a second preferred embodiment of the present invention.
Figure 9C:
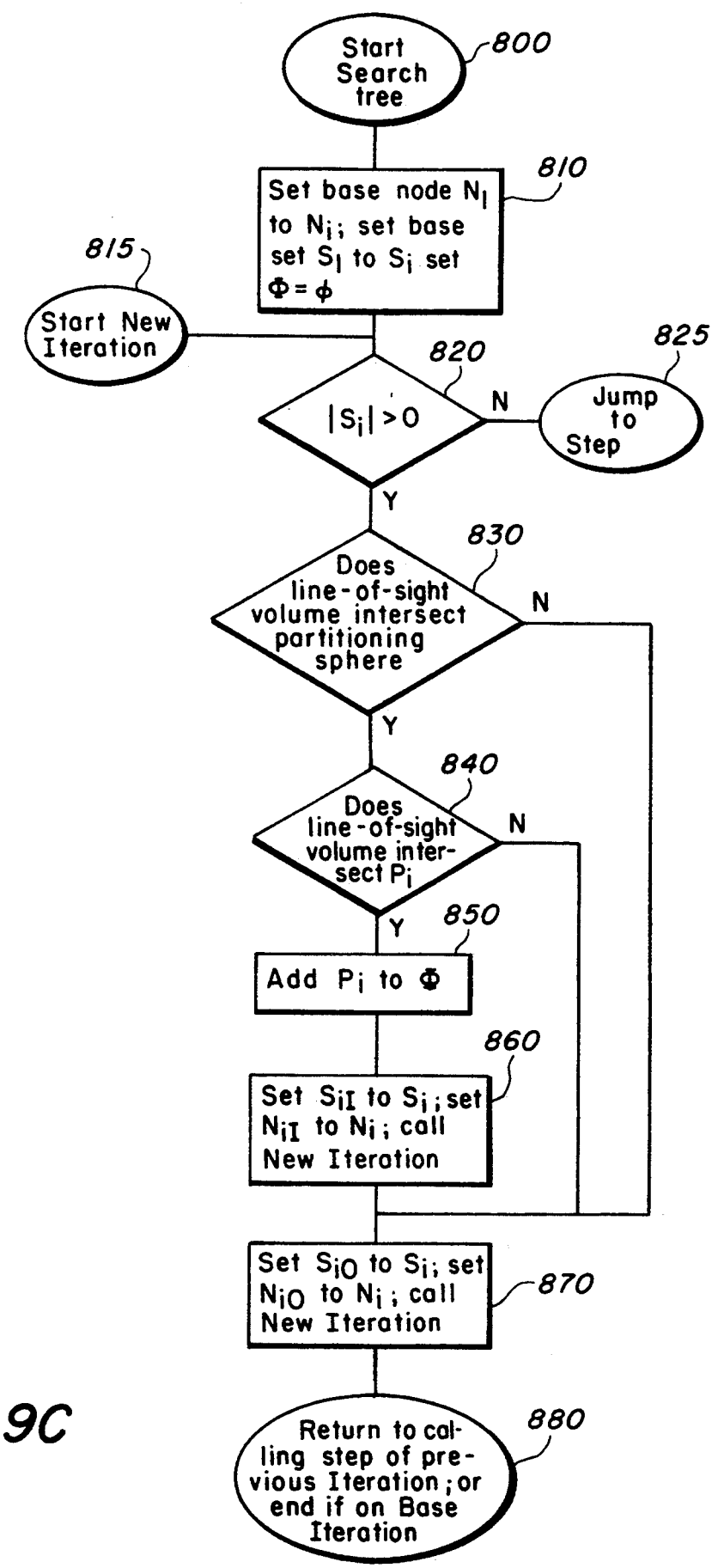

In a second, alternative, preferred embodiment, a plurality of point measurement estimates 72 are generated by the sensor 12, as shown in FIG. 9A. As shown in FIG. 9B, a node tree is iteratively formed by arbitrarily selecting a current point measurement estimate P$_i$ from the set S$_i$ of all current point measurement estimates and determining a metric δ$_i$ for each other point measurement estimate of the set S$_i$ relative to the current point measurement estimate P$_i$. In the second preferred embodiment, each metric S$_i$ is equal to the straight line distance from the current point measurement estimate P$_i$ to one other point measurement estimate. The median metric, or distance, δ$_m$ is determined. A spherical shell M$_i$ is formed, with the current point measurement estimate P$_i$ at the center, having a radius equal to the median metric S$_m$. The current set of point measurement estimates S$_i$ is divided into two sets. Set S$_{iO}$ is the set of all points having metrics δ$_i$ greater than the median metric δ$_m$. Set S$_{iI}$ is the set of all point measurement estimates having metrics δ$_i$ less than or equal to the median metric δ$_m$. Daughter nodes N$_{iI}$ and N$_{iO}$ are formed, and sets S$_{iI}$ and S$_{iO}$ are associated to them, respectively. The process is then iteratively repeated until each point measurement estimate P$_i$ is associated with a node, as in the first preferred embodiment.

As shown in FIG. 9B, to search the point measurement tree, the field of view 70 is divided into two sections, region 74 outside the spherical shell and region 76 on and inside the spherical shell. Given an actual measurement 78 and an associated error radius r$_e$, the measurement volume 80 defined by the measurement 78 and error radius r$_e$ may or may not intersect the spherical shell M$_i$ of a current node N$_i$. If the measurement volume 80 does intersect the spherical shell M$_i$, the arbitrary point measurement estimate P$_i$ associated with the current node N$_i$ is checked to determine of it intersects the measurement volume 80. If so, the arbitrary point measurement estimate P$_i$ is added to the set Φ, for which a brute force comparison is necessary.

Accordingly, when the measurement volume 80 does not intersect the spherical shell, any point measurement estimate 72 lying on or within the spherical shell can be omitted from a brute force correlation process, thereby providing a computational efficiency. Again, each node $N_i$ of the tree is iteratively searched, continuing to search each inside node $M_{iI}$ and its daughter nodes only when the measurement volume 80 intersects the spherical shell $M_i$ associated with the node $N_i$. However, as the measurement volume 80 will always intersect the region outside of the spherical shell, the outside node $N_{iO}$ of each node $N_i$ will always have to be searched. It is understood that this second preferred embodiment can also be used in volume measurement estimate systems. Likewise, the first preferred method can also be used in point measurement estimate systems.

While the invention has been described with reference to the embodiments disclosed, it will be appreciated that numerous changes and modifications are likely to occur to those skilled in the art and is intended to cover all changes and modifications which fall within the true spirit and scope of the invention.

I claim:

1. A method for correlating measurements to at least one of a plurality of tracks, wherein each of the plurality of tracks is generated from previous, corresponding measurements and corresponds to the relative movement between an object and an origin of the measurement, comprising the steps of:

determining a measurement estimate for each of the plurality of tracks for a current sighting period, each said measurement estimate defining a volume measurement estimate;

iteratively building a volume measurement tree from the plurality of track volume measurement estimates;

generating at least one current measurement, each at least one measurement defining a volume measurement;

iteratively searching the volume measurement tree for one of at least one measurement, wherein for each track volume measurement estimate intersected by the measurement volume of said one of the at least one measurement, the corresponding track is correlated to said one of the at least one measurement;

wherein the step of iteratively building the volume measurement tree comprises the steps of:

defining a base set comprising all of the track volume measurement estimates;

defining a base node associated with the base set;

beginning a first iteration with the base node as a current node; and ending the first iteration, wherein each iteration comprises the steps of:

selecting the set associated with the current node as the current set;

determining a number of track volume measurement estimates in the current set;

ending the current iteration and returning to the previous iteration if the current set is empty;

otherwise, ending the current iteration and returning to the previous iteration if the current set has one track volume measurement estimate, after defining a current minimal enclosing volume as the one track volume measurement estimate;

otherwise, determining the current minimal enclosing volume which enclose all the track volume measurement estimates of the current set;

selecting and removing an arbitrary track volume measurement estimate from the current set and associating it with the current node;

selecting an arbitrary partitioning plane which partitions the current minimal enclosing volume;

determining a current left subset of the current set as all track volume measurement estimates entirely left of the partitioning plane;

determining a current middle subset of the current set as all track volume measurement estimates intersecting the partitioning plane;

determining a current right subset of the current set as all track volume measurement estimates entirely right wards of the partitions plane;

associating the left subset with a left daughter node;

beginning a first new iteration with the left daughter node as the current node;

returning from the first new iteration;

associating the middle subset with a middle daughter node;

beginning a second new iteration with the middle daughter node as the current node;

returning from the second new iteration;

associating the right subset with a right daughter node;

beginning a third new iteration with the right daughter node as the current node; and returning from the third new iteration;

returning from the current iteration to a previous iteration; and wherein the step of iteratively searching the volume measurement tree comprises the steps of:

selecting a current measurement having a volume measurement;

selecting the base node;

beginning a first search iteration with the base node as the current node;

ending the first iteration; and outputting a correlation set comprising the track volume measurement estimates intersected by the measurement volume, wherein each search iteration comprises the steps of:

determining if the set associated with the current node has at least one track volume measurement estimate;

ending the current search iteration and returning to the previous search iteration if the current set does not have at least one track volume measurement estimate;

determining if the volume of the current measurement intersects the track volume measurement estimates associated with the current node;

adding the associated track volume measurement estimates to the correlation set if it does intersect the measurement volume;

determining if the measurement volume intersects the minimal enclosing volume associated with the current node;

ending the current iteration and returning to the previous iteration if the minimal enclosing volume does not intersect the measurement volume;

beginning a first new search iteration with the left daughter node as the current node;

returning from the first new iteration;

beginning a second new search iteration with the middle daughter node as the current node;

returning from the second new iteration;

beginning a third new search iteration with the right daughter node as the current node;
returning from the third new iteration;
returning from the current search iteration.

2. The method of claim 1, further comprising the steps of determining which of the correlated tracks corresponds to said one of the at least one measurement; and updating the corresponding track from the current corresponding one of the at least one measurement and the previous corresponding measurement.

3. The method of claim 2, further comprising the step of outputting the updated track as a control signal.

4. The method of claim 3, further comprising the step of controlling with the control signal one of a visual display processor, a weapon fire controller, and a sensor controller.

5. The method of claim 1, wherein the volume measurement is a line measurement.

6. The method of claim 1, wherein the volume measurement estimate is a point measurement estimate.

7. The method of claim 1, wherein the measurement is a line-of-sight measurement.

8. The method of claim 1, wherein the measurement is a range measurement.

9. The method of claim 1, wherein the measurements are sensor measurements.

10. The method of claim 9, wherein the sensor measurements are made by an active sensor.

11. The method of claim 10, wherein the active sensor is one of a radar sensor, a sonar sensor, and an optical sensor.

12. The method of claim 9, wherein the sensor measurements are made by a passive sensor.

13. The method of claim 12, wherein the passive sensor is one of an optical sensor, a photographic sensor, a SQUID-type sensor, an opto electric sensor, and an electromagnetic sensor.

14. The method of claim 9, wherein the objects are physical bodies moving in a 3 dimensional space through a field of view of a sensor.

15. The method of claim 14, wherein the physical bodies are at least one of a submarine, a boat, a fish, a missile, a torpedo, an aircraft, a ballistic missile, chaff, a decoy, a satellite, a rocket, a space craft, and an asteroid.

16. The method of claim 1, wherein the measurements of the plurality of objects are generated from a simulation of a physical system, wherein the simulated objects are moving in a simulated space through a field of view of a simulated sensor.

17. The method of claim 1, wherein the simulation of a physical system is one of a molecular dynamic simulation, a biological system simulation and a high energy physics simulation.

18. The method of claim 1, wherein the measurements are generated from a person interacting with a virtual reality and the objects are virtual objects within the virtual reality.

19. The method of claim 1, wherein the minimal enclosing volume is a convex hull.

20. The method of claim 1, wherein the minimal enclosing volume is a polyhedron.

21. The method of claim 20, wherein the minimal enclosing volume is a rectangular polyhedron.

22. A method for correlating measurements to at least one of a plurality of tracks, wherein each one of the plurality of tracks is generated from previous, corresponding measurements and corresponds to the relative movement between an object and an origin of the measurements, the method comprising the steps of:

defining a track estimate for each of the plurality of tracks for a current sighting period, each said track estimate defining a track point measurement estimate in a field of view;

iteratively building a point measurement tree from the plurality of track point measurement estimates;

generating at least one current measurement, each at least one measurement defining a volume measurement; and iteratively searching the point measurement tree for one of the at least one measurement wherein for each track point measurement estimate intersected by the volume measurement of said one of the at least one measurement, the corresponding track is correlated to said one of the at least one measurement;

wherein the step of iteratively building the point measurement tree comprises the steps of:

defining a current set of track point measurement estimates;

associating a current node to the current set;

selecting an arbitrary one of the track point measurement estimates of the current set;

determining a current metric for each track point measurement estimate of the current set relative to the selected track point measurement estimate;

determining the current median metric for the current set;

defining a current partitioning sphere for the current set having a radius equal to the current median metric and a center of the partitioning sphere at the selected track point measurement estimate;

dividing the current set of track point measurement estimates into an inside set and an outside set, the inside set comprising all track point measurement estimates of the current set whose metric is less than or equal to the current median metric, and the outside set comprising all other track point measurement estimates of the current set;

beginning a first new iteration with the inside set as the current set;

returning from the first new iteration;

beginning a second new iteration with the outside set as the current set;

returning from the second new iteration; and returning to a previous iteration.

23. The method of claim 22, wherein the step of iteratively searching the point measurement tree comprises the steps of:

selecting one of the at least one measurement;

defining a volume measurement for the selected one of the measurement;

iteratively searching each node of the search tree to determine the set of correlated track point measurement estimates; and outputting the set of correlated track point measurement estimates, where the step of iteratively searching each node comprises the steps of:

selecting a current node;

determining if the volume measurement intersects the partitioning sphere of the current node;

if the volume measurement intersects the partitioning sphere, determining if the current track point measurement estimate at the center of the partitioning sphere intersects the volume measurement;

adding the current track point measurement estimate to the correlation set, if it intersects the volume measurement;

beginning a first new iteration with the associated inside set as the current set;

returning from the first new iteration;

beginning a second new iteration with the associated outside set as the current set;

returning from the second new iteration; and returning from the current iteration.

24. The method of claim 22, wherein each metric is equal to the distance between the selected track point measurement estimate and another track point measurement estimate.

25. The method of claim 22, wherein the point measurement estimate has a volume greater than zero.

26. The method of claim 22, wherein the volume measurement is a line measurement.

27. The method of claim 22, wherein the measurement is a line-of-sight measurement.

28. The method of claim 22, wherein the measurement is a range measurement.

* * * * *